May 9, 1961　　　R. S. G. SCHMIDT　　　2,983,637
GEAR BELT
Filed Dec. 23, 1958　　　2 Sheets-Sheet 1
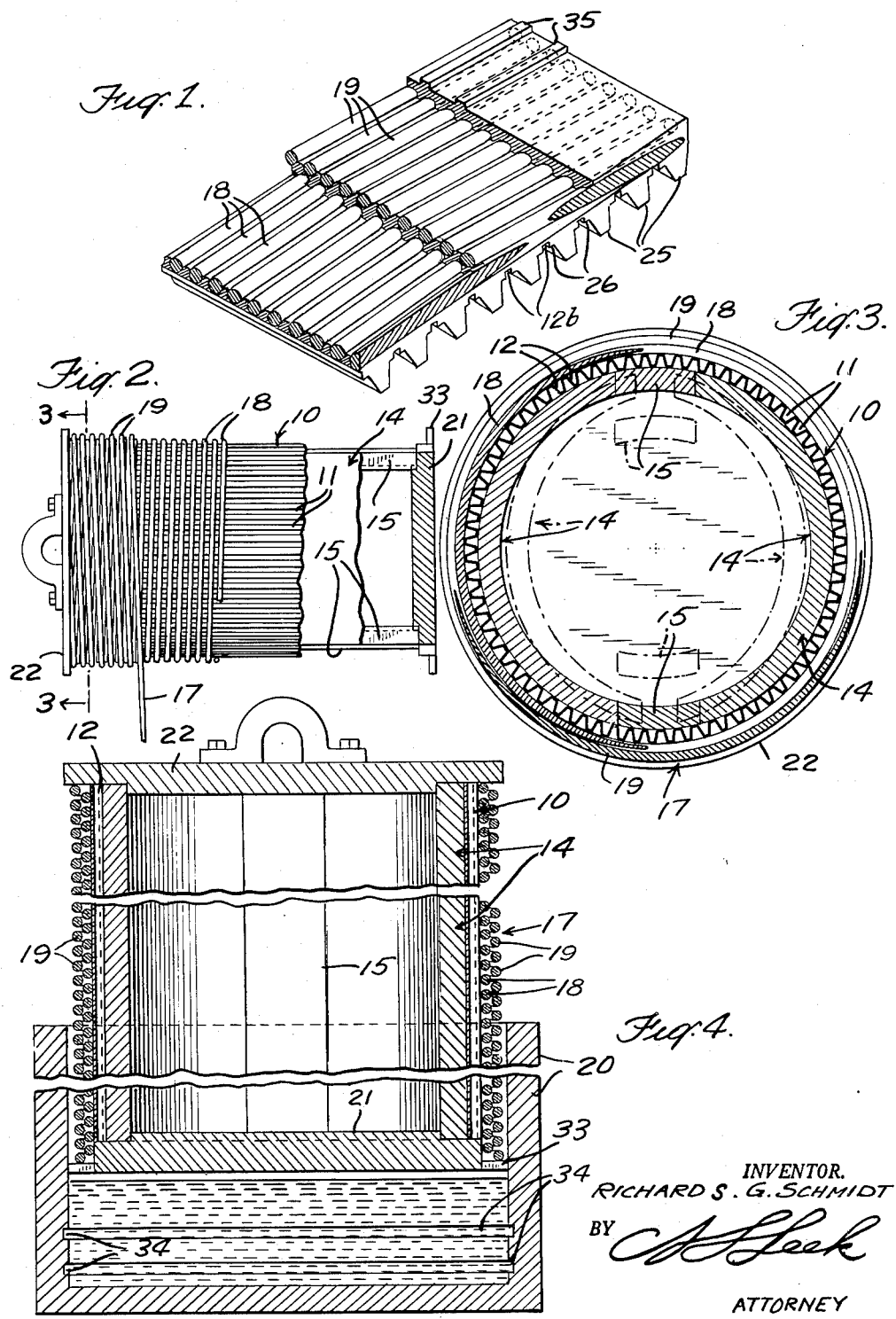
INVENTOR.
RICHARD S. G. SCHMIDT
BY
ATTORNEY May 9, 1961    R. S. G. SCHMIDT    2,983,637
GEAR BELT
Filed Dec. 23, 1958    2 Sheets-Sheet 2
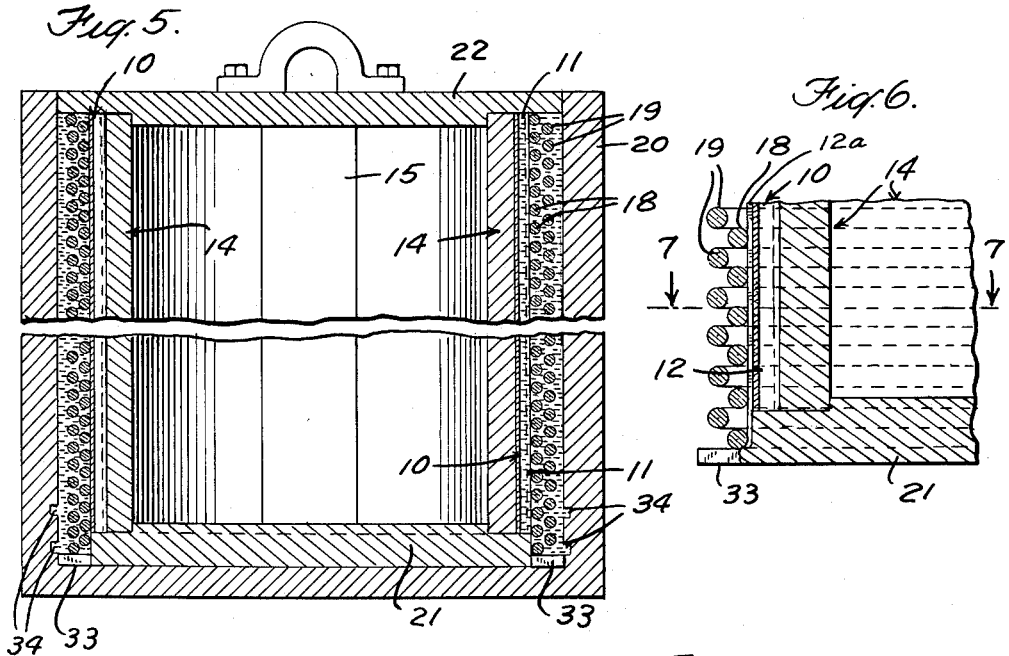
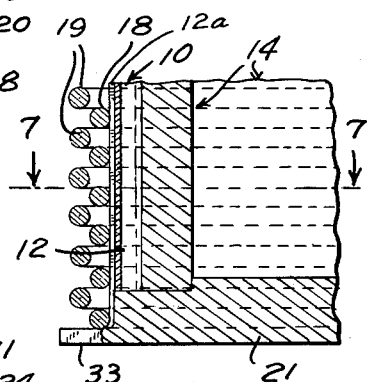
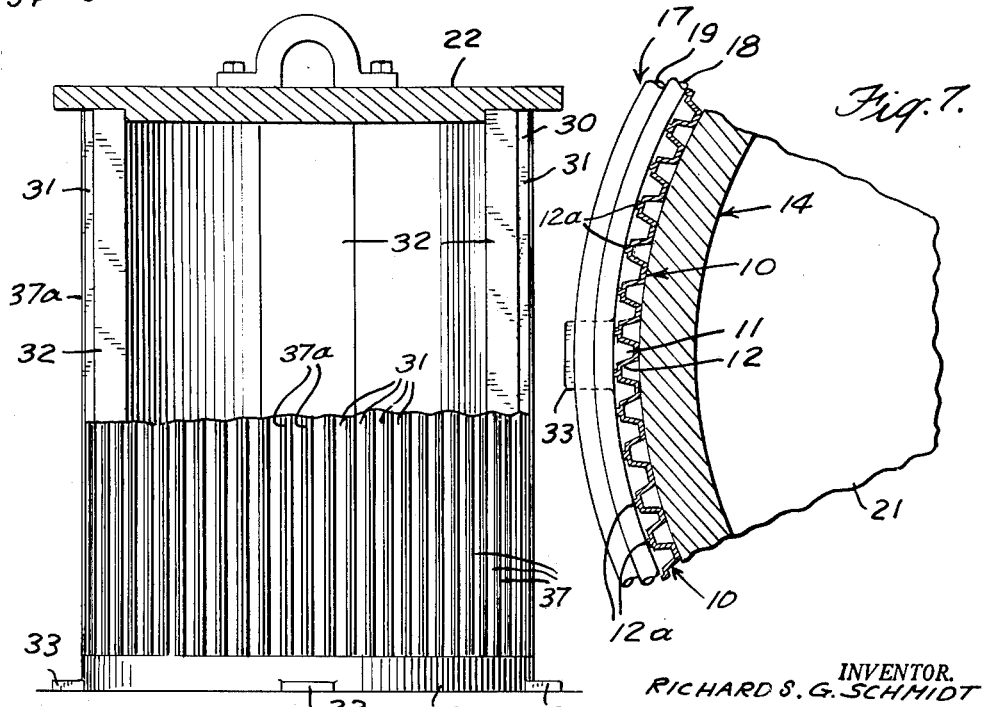
INVENTOR.
RICHARD S. G. SCHMIDT
BY
ATTORNEY United States Patent Office 2,983,637
Patented May 9, 1961

2,983,637
GEAR BELT
Richard S. G. Schmidt, Middletown, Conn., assignor to The Russell Manufacturing Company, Middletown, Conn., a corporation of Connecticut
Filed Dec. 23, 1958, Ser. No. 782,420
2 Claims. (Cl. 154—52.1)

This invention relates to gear belts and to a method of making the same.

An object is to provide a belt of the above type in which the tendency to creep sidewise or to fray at the edges is eliminated.

Another object is to provide a gear belt in which the teeth are securely bonded to the cords.

Another object is to provide a novel and improved method for making such a belt.

Other objects and advantages will be apparent as the nature of the invention is more fully disclosed.

This application is a continuation-in-part of application Serial No. 674,374, filed July 26, 1957 (now abandoned).

In gear belts of the above type difficulty is encountered in bonding the teeth to the cords securely enough to prevent the teeth from being sheared off in response to excessive forces, as when the driven member becomes jammed while power is being applied to the driving member.

It has been found that this trouble is overcome, particularly in miniature belts which normally transmit a relatively small amount of power such as in an electric typewriter by making the cords of Dacron (a condensation polymer of ethylene glycol and terephthalic acid) and impregnating the cords with and forming the teeth of polyurethane which has the property of bonding securely to Dacron, possibly by a reaction at the interface. The bonding effect is enhanced by forming the teeth with lips which extend along the cords substantially to the median line between adjacent teeth and thus provide extended contacting surfaces with the cords.

In accordance with the present invention the belt is composed of a pair of layers of Dacron cords wound helically across the belt in opposite directions and embedded in polyurethane which is molded to form gear teeth on the contacting surface of the belt. The helically laid cords provide the necessary tensile strength and, due to the opposite pitch of the two layers any side pull or tendency to creep is avoided so that the belt can be used on flat surfaced pulleys or rolls without side positioning flanges which would tend to fray the edges of the belt.

The belt is produced by forming a series of longitudinal grooves in a mandrel or in a metal sheet which is wrapped around a collapsible cylindrical mandrel. The layers of cords are wound on the outer surface of the grooved mandrel or sheet after which the unit is forced into an outer die member containing the liquid impregnant. The impregnant is thus forced around the layers of cords and into the grooves in the mandrel.

The impregnated layers of cords are then cured while in the mold to set the polyeurethane impregnant which bonds the cords and forms teeth on the inner contacting surface of the belt. After curing the mandrel is collapsed for the removal of the belt or the belt is stripped axially from the mandrel. If a grooved metal sheet is used the mandrel is first pulled out and the sheet collapsed to release the belt.

The nature of the invention will be better understood from the following description, taken in connection with the accompanying drawings forming a part thereof in which a specific embodiment has been shown for purposes of illustration.

In the drawings:

Fig. 1 is a broken perspective view of a belt embodying the invention;

Fig. 2 is a broken elevation showing the cords wound on a mandrel;

Fig. 3 is a transverse section taken on the line 3—3 of Fig. 2 but on a larger scale illustrating the construction of the collapsible mandrel and windings;

Fig. 4 is a vertical section through the mold with the mandrel being inserted;

Fig. 5 is a view similar to Fig. 4 showing the mandrel fully inserted;

Fig. 6 is a partial enlarged section showing the disposition of the impregnant;

Fig. 7 is a transverse section taken on the line 7—7 of Fig. 6; and

Fig. 8 is a section similar to Fig. 4 showing a further embodiment of the invention wherein a grooved mandrel is used.

Referring to the drawings more in detail a metal sheet 10 having grooves 11 on the outside spaced to form ribs 12 therebetween is wrapped around a collapsible mandrel 14 which may be of any convenient construction and is shown as formed by segments 15 which are normally extended as shown in full lines in Fig. 3 but may be retracted to the dotted line position of Fig. 3. The sheet 10 may be grooved by passing the same between gear wheels having correspondingly shaped teeth. The grooves 11 on the outer surface of the sheet are shaped to form molds in which the teeth of the belt are to be formed. The ribs 12 are provided with longitudinal bosses 12a adapted to hold the cords spaced from the surface of the ribs 12.

The cords 17 are wound in two layers 18 and 19 around the sheet 10 as shown in Fig. 2. The cords in the two layers are fed in opposite directions to form helices having an opposite inclination or pitch so that the longitudinal pull or tension is balanced and the tendency of the belt to creep sidewise is eliminated.

The wound mandrel is now inserted in a case 20 forming the outer portion of the mold, which contains a predetermined amount of liquid polyeurethane.

As the wound mandrel is inserted into the case 20 as shown in Figs. 4 and 5, the liquid polyurethane is forced upwardly around the cords and into the space beneath the cords 17 on the ribs 12 and into the grooves 11. The bottom of the mandrel may be closed by a suitable plate 21 to confine the impregnant to the desired areas and the mandrel may be centered at the top and the case 20 closed by a top plate 22 so that pressure can be applied to the impregnant to cause the liquid to fill completely the various mold cavities, as shown in Fig. 5. The bottom plate 21 is provided with lugs 33 for centering the mandrel.

The filled mold shown in Fig. 5 may be heated by suitable means, as by a high frequency electric field, by fluids, or by a heater inserted within the mandrel, to facilitate the curing of the impregnant and produce the desired flexible but strong coating around the cord layers and in the grooves 11.

The polyurethane in liquid form is mixed with an isocyanate before being applied to the mold. The composition has the property of setting to form the strong flexible product above described. This setting may take place without heating but is facilitated by heating the mold.

After curing the completed belt may be removed by withdrawing the mandrel from the sheet 10 with or without first collapsing the mandrel, thus stripping the sheet 10 from the cured belt. The inner surface of the case 20 may be provided with a set of shallow grooves 34 in which the impregnant is forced to form beads 35 on the outer surface of the belt. These beads serve to hold the belt in the case during the removal of the mandrel. After the mandrel is removed, however, the belt is readily stripped from the inner surface of the case.

The product is shown in Fig. 1 wherein the cured impregnant forms teeth 25 on the inside of the belt conforming to the shape of the grooves 11 of the sheet 10.

Similar teeth, not shown, may be formed on the outer surface of the belt by forming grooves in the inner surface of the case 20. The teeth 25 include lips 26 formed by the impregnant in the areas between the cords 17 and the surface of the ribs 12 where the cords are spaced from the ribs by the bosses 12a. These lips 26 provide a substantial area of contact with the cords and ensure a strong bond. The bosses 12a form grooves 12b on the inner surface of the belt between adjacent teeth.

The comparatively wide belt thus formed may be cut into the narrow widths required for the uses above mentioned. When so cut the cords 17 which are exposed at the cut edges are securely bonded by the impregnant. The case 20 may be split if desired to facilitate the removal of the belt. If desired, the mandrel may be slightly tapered and a parting solution may be applied to the outer surface of the sheet 10 to permit the finished belt to be removed axially without collapsing the mandrel.

Fig. 8 illustrates a further embodiment in which the outer surface of the mandrel 30 is formed with grooves 31 and ribs 37 having thereon bosses 37a corresponding to the grooves 11 and ribs 12 and bosses 12a of the sheet 10. The mandrel 30 is shown as formed of collapsible segments 32 as in the case of the mandrel 14. In this embodiment the cords are wound directly onto the mandrel without the intervening sheet 10. The operations are otherwise similar to those above described.

What is claimed is:

1. A miniature gear belt comprising a pair of layers of parallel cords, the cords in each layer extending longitudinally of said belt and being disposed in the form of a compact helix with adjacent cords in close contact, the helices of the two layers being of opposite pitch whereby any transverse component of the longitudinal pull of said cords is equalized, and a cured impregnant surrounding said cords to form the belt surfaces, at least one of said surfaces having the form of gear teeth composed of said impregnant, said teeth including lips of said cured impregnant extending along said cords to substantially the median line between adjacent teeth, the lips of the adjacent teeth being separated by a transverse groove in said impregnant, said teeth and lips being bonded to said cords.

2. A miniature gear belt as set forth in claim 1 in which said impregnant is polyurethane and said cords are composed of a condensation polymer of ethylene glycol and terephthalic acid.

References Cited in the file of this patent

UNITED STATES PATENTS

| | | |
|---|---|---|
| 1,976,015 | Gilmer et al. | Oct. 15, 1934 |
| 2,507,852 | Case | May 16, 1950 |
| 2,699,685 | Waugh | Jan. 18, 1955 |
| 2,797,729 | Runton | July 2, 1957 |
| 2,802,511 | Waugh | Aug. 13, 1957 |
| 2,831,359 | Carle | Apr. 22, 1958 |
| 2,865,214 | Runton | Dec. 23, 1958 |